United States Patent [19]

Brown

[11] Patent Number: 4,881,491
[45] Date of Patent: Nov. 21, 1989

[54] WINDOW BIRD FEEDER

[76] Inventor: Arthur C. Brown, P.O. Box 277, West Kingston, R.I. 02892

[21] Appl. No.: 250,608

[22] Filed: Sep. 29, 1988

[51] Int. Cl.$^4$ ............................................. A01K 31/00
[52] U.S. Cl. ................................................. 119/51.01
[58] Field of Search .................. 119/51 R, 52 R, 51.5, 119/61

[56] References Cited

U.S. PATENT DOCUMENTS

| 2,230,058 | 1/1941 | Hornung | 119/51 R |
| 2,532,726 | 12/1950 | Lajoie et al. | 119/52 R |
| 2,556,707 | 6/1951 | Reddall et al. | 119/52 R |
| 2,673,551 | 3/1954 | McAnly | 119/51 R |
| 2,775,226 | 12/1956 | Early | 119/51 R |
| 2,891,711 | 6/1959 | Early | 119/51 R |
| 3,086,499 | 4/1963 | Dilley | 119/51 R |
| 3,124,103 | 3/1964 | Stainbrook | 119/51 R |
| 3,164,130 | 1/1965 | Curtis et al. | 119/51 R |
| 3,291,100 | 12/1966 | Negaard | 119/51 R |
| 3,314,397 | 4/1967 | Jacobsen | 119/51 R |
| 3,604,601 | 9/1971 | Boling | 119/51 R |
| 4,167,917 | 9/1979 | Noll | 119/51 R |
| 4,231,326 | 11/1980 | Hager | 119/52 R |

Primary Examiner—Paul J. Hirsch
Attorney, Agent, or Firm—Barlow & Barlow, Ltd.

[57] ABSTRACT

A window bird feeder has a rectangular body with translucent rear and side walls and an open front. The structure is adapted to be fitted into a double-hung window with the body lying inside the dwelling. The structure is mounted on the window sill in a lateral position so that the front edges of the body do not interfere with the closing of the lower sash and to provide a perch for the birds, a perch is hinged to the front edge of the bottom wall of the structure, which perch can be swung into the structure and permit the window to be closed.

2 Claims, 1 Drawing Sheet

U.S. Patent  Nov. 21, 1989  4,881,491
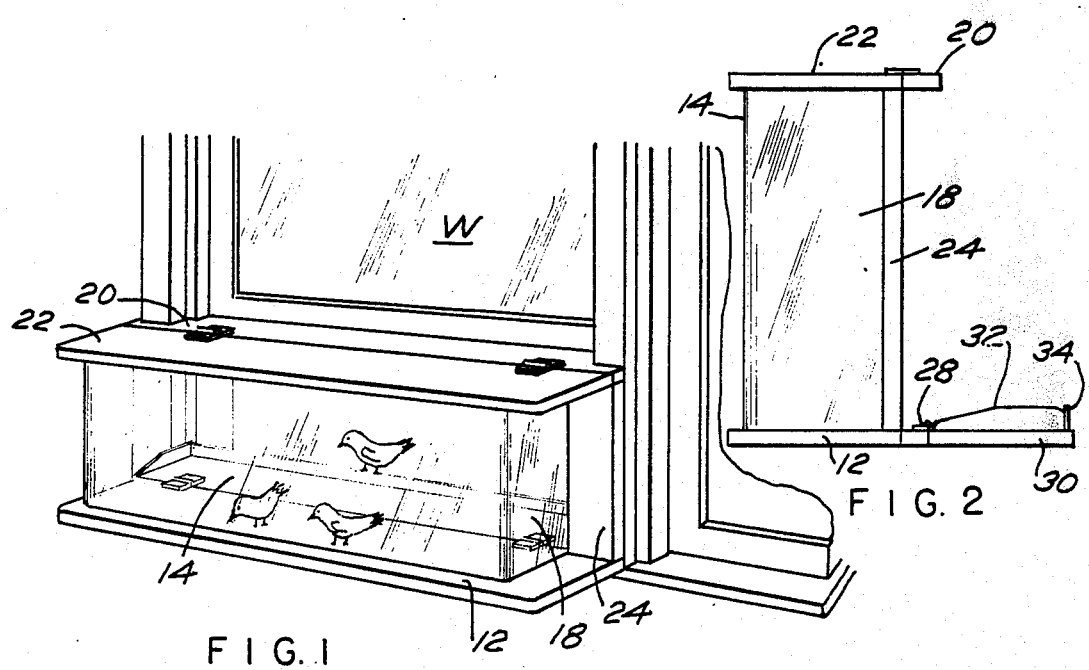
FIG. 1
FIG. 2
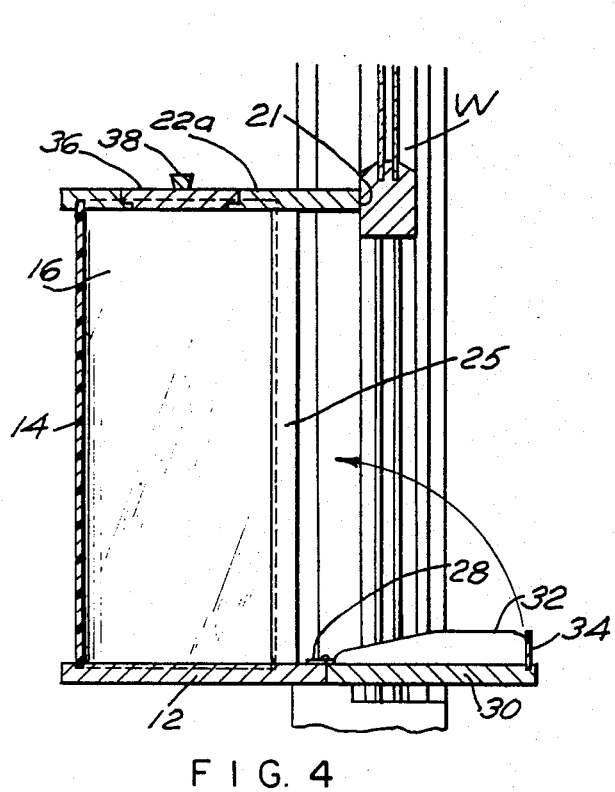
FIG. 4
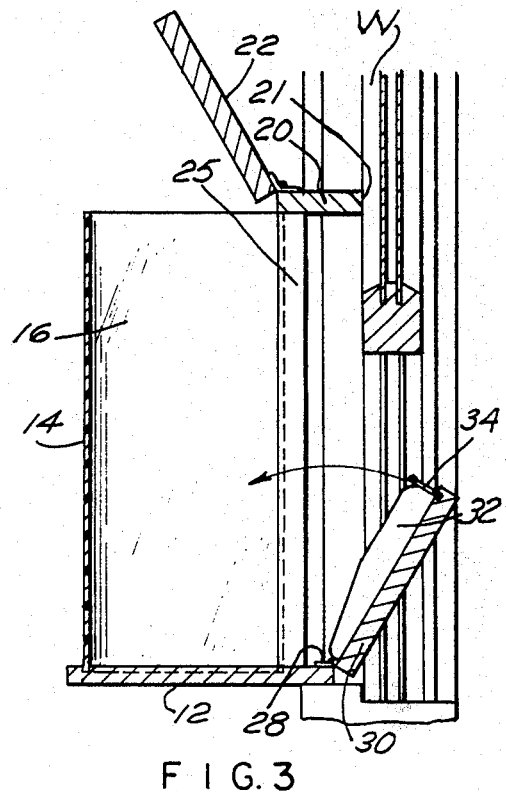
FIG. 3

WINDOW BIRD FEEDER

BACKGROUND OF THE INVENTION

It has been proposed in the past to provide bird feeders fitted into windows. For example, at least as early as 1915, the National Association of Audubon Societies proposed a windowbox fitted into an open window with the sash coming down snugly into a groove in the woodwork on the top wall of the box. The box was fitted with a transparent glass back wall so that one sitting in the room could view the birds that would come into the box and the birds could see also. There has also been proposed a birdfeeder that would fit onto a windowsill in an open window as seen, for example, in the Thatcher patent, U.S. Pat. No. 2,430,541. In some of these prior proposals, the birds can readily view the occupants of the room in which the window is fitted and this may, in many instances, tend to scare the birds away from the feeding station. It is therefore proposed to eliminate this problem and, also, to provide a window birdfeeder of a structure wherein the window may be closed behind the windowbox so that drafts and insects and the like may be kept out, particularly in the evening.

SUMMARY OF THE INVENTION

A window birdfeeder has a rectangular body that consists of a solid bottom wall and a three sided enclosure of one-way glass, or the like, with an open front. A top wall with an opening or hinged cover is provided and fastening plates extend from the end walls outwardly to allow the unit to be secured to the casing of a windrowing. The front edge of the bottom wall is provided with a hinged perch shelf which extends outwardly from the window sill a distance sufficient to permit the birds to alight thereon and is hinged to the bottom wall so that the same may be brought up and into the box to permit the window to be closed.

DESCRIPTION OF THE DRAWINGS

FIG. 1 is a perspective view taken from inside the room of a building showing my window bird feeder in place;

FIG. 2 is an end view thereof;

FIG. 3 is a vertical sectional view illustrating the perch being hinged upwardly for storage and the lid of the box being opened to place food therein; and FIG. 4 is a vertical sectional view of an alternate embodiment.

DESCRIPTION OF THE PREFERRED EMBODIMENTS

A window bird feeder in accordance with FIGS. 1-3 of this invention comprises a rectangular box having a solid bottom wall 12 with suitable cutouts at its side edges for convertibility to the window casing, an open front, a translucent back wall 14 and translucent end walls 16, 18. A top wall, in accordance with this embodiment, has a fixed portion 20 and a hinged portion 22 which permits access into the interior of the box while the fixed portion is suitably provided with cutouts at the side edges to fit about a window casing. Extending between the top wall 20 and the bottom wall 12, are a pair of fastening members or plates 24, 25 which are securely fastened to the side edges of the bottom wall and the top wall. Preferably, the end walls 16, 18 and the back wall 14 are integral and are treated with a film so that they are effectively a one-way mirror. The end walls 16, 18 and the back wall 14 are received in grooves of the bottom wall 12 so that the one-way mirrored structure is made integrally sound with the bottom wall and this permits the hinged top wall 22 to merely lie upon the upper edge of the end walls 16, 18 and the back wall 14. The front edge of the bottom wall 12 has hinged thereto as at 28, a perch 30, which perch may ideally be formed with lips such as 32, 34 so that any food that may be scattered by the birds will not fall to the ground. As seen in FIG. 3 of the drawing, the perch 30 may be rocked counterclockwise into a storage position within the box portion of the window bird feeder to allow the window to be closed.

The dimensions of the window bird feeder are such that it can be placed in a window frame and retained therein by placing a fastening through the plates 24, 25 that would go into the framing studs of the window frame and the casing strips that are laid thereon for aesthetic reasons. The front edge of the top wall 20 and front edge of the bottom wall 12 would be such that they would be inside the window track in the jambs of the window frame and in a position on the windowsill so as to permit the window W to be closed when desired, as seen in FIG. 3 and when in the open position, the bottom sash of the window frame can readily engage the front edge 21 of the top wall 20 in a relatively tight fit. When it is desired to place food into the feeder, the hinged wall 22 can readily be raised as seen in FIG. 3 to give access to the interior.

The embodiment illustrated in FIG. 4 is identical to the previous described structure in most details save for the construction of the top wall and similar reference numerals to the previous structure have been used. As illustrated, the top wall 22a is constructed of a single piece of material with a groove cut therein to accept the upper edge of the back and side walls 14, 16 and 18. A thinner material may be used for walls 14, 16, 18, with the walls secured in both the bottom wall 12 and the top wall 22a, and still form a rigid structure. To permit access into the window box for placing bird food therein and to gain access to the perch 30, a removable door 36 is formed to fit into a rabbit in the top wall 22a and of a size so that a person's hand and arm can easily reach inside and give sufficient room to maneuver. A handle 38 will allow the door to be raised and lowered and although not shown, simple fastening means may be used to secure the door in position.

It is also possible to make the vertical walls, consisting of the back wall 14 and the end walls 16, 18, of sperate pieces of plastic material where, rather than having a continuous strip as seen in the drawing, there would merely be a square corner. It should also be understood that the back wall 14 and the end walls 16, 18 are coated in such a way so as to give them the effect of one-way glass and in that way, as long as the degree of illumination is different on both sides of the material, the birds cannot see the people that are viewing them inside the room.

I claim:

1. In combination with a window and frame therefor a window bird feeder for mounting inside a dwelling comprising a substantially rectangular body having a closed rear with an open front facing the window, end walls and a back wall at least one of which is translucent, top and bottom walls, the bottom wall resting in part on the inside sill of a window frame, the top wall providing an access port opening into the interior of the rectangular body, said top wall having a front edge that lies on a line extending between the inside track of the window frame so that the edge may normally lie against the bottom sash of the window, a mounting member adjacent the end walls extending between the top and bottom walls to allow the box to be fastened to the window frame, a perch hinged to the front edge of the bottom wall to normally lie in the same plane as the bottom wall, said perch extending outwardly over the sill when the box is mounted in a window frame and adapted to fold inside and over the bottom wall in an arc in excess of 90° whereby the window may be closed when the perch is folded inside and over the bottom wall.

2. A window bird feeder for mounting in a dwelling comprising a bottom wall that rests in part on the inside sill of a window frame, a pair of vertical members affixed to each side edge of the bottom wall, a top wall having a portion thereof extending between the members with an access port located inside the dwelling, vertically disposed translucent back and end walls rising from the bottom wall and an open front facing the window, a perch hinged to the front edge of the bottom wall normally lying as an extension of the bottom wall but adapted to fold inside and over the bottom wall in an arc in excess of 90°, the front edge of the bottom and top walls lying on a vertical plane inside the window track of the jamb of the window whereby the window may be closed when the perch is folded inside and over the bottom wall.

* * * * *